Feb. 25, 1930. H. B. MORTIMER 1,748,075
ELECTRIC MOTOR AND DYNAMO MACHINE
Filed Dec. 8, 1928
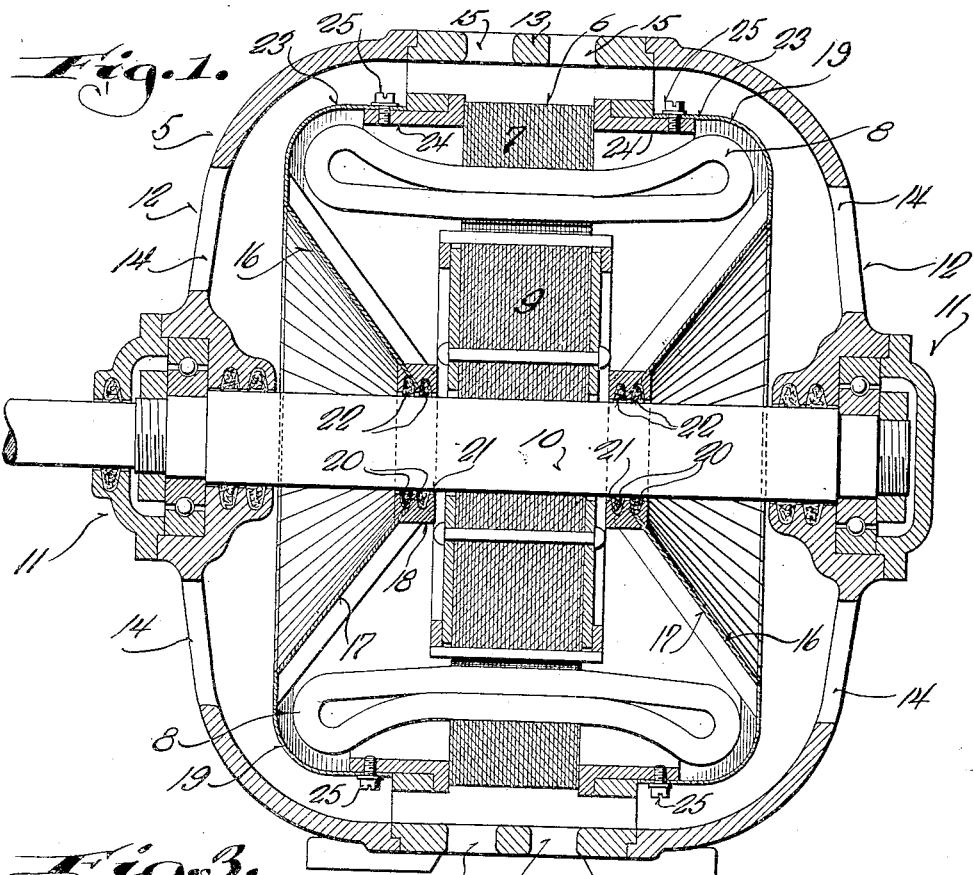
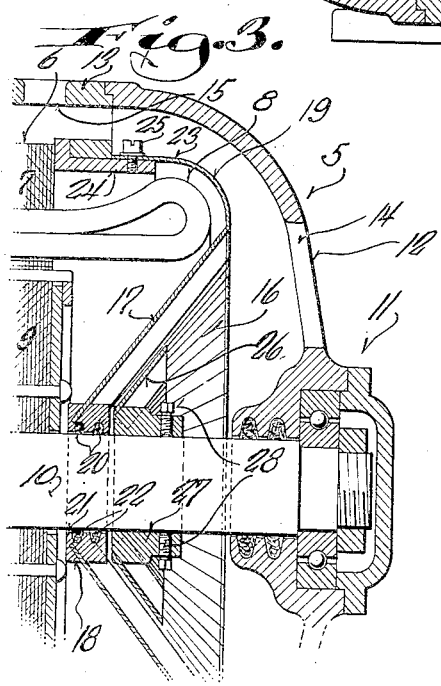
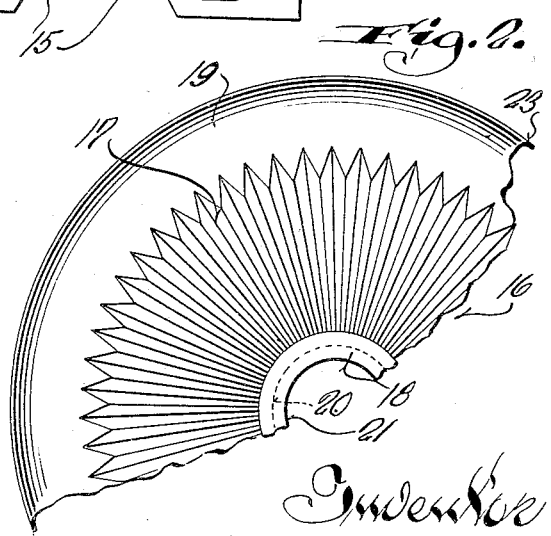
Inventor
Harry B. Mortimer
By Ira Milton Jones
Attorney Patented Feb. 25, 1930

1,748,075

UNITED STATES PATENT OFFICE

HARRY B. MORTIMER, OF MILWAUKEE, WISCONSIN, ASSIGNOR TO SILCOCK AIRADIATOR CORPORATION, OF MILWAUKEE, WISCONSIN, A CORPORATION OF WISCONSIN

ELECTRIC MOTOR AND DYNAMO MACHINE

Application filed December 8, 1928. Serial No. 324,737.

This invention relates to certain new and useful improvements in electric motors and dynamo machines and refers more particularly to means for excluding extraneous matter from the live parts of the machine and at the same time dissipating heat generated within the machine.

In Letters Patent No. 1,677,433, issued Carl L. Daun, July 17, 1928, a runner or rotating member is mounted on the shaft of a motor or dynamo machine with means at its outer periphery to provide a connection between it and a stationary member secured to any suitable stationary part of the machine and preferably enclosing the stator windings. While the structure of the Daun patent functions perfectly and obtains the desired results, difficulty is experienced in the field, where proper machinery and tools are lacking, in properly aligning the runner with the stationary member inasmuch as the permissible clearance is relatively small.

Therefore, this invention has as an object the provision of an improved means for enclosing the live parts of the machine and dissipating the heat generated therein, which obviates the necessity of careful and exact fitting by the provision of a stationary enclosing unit having a part extending over the stator windings and another part directed inwardly of the ends of the windings to lie in close proximity to the point of greatest heat.

Another object of this invention resides in the provision of an enclosing and cooling unit of the character described, the major portion of which is pleated or fluted to provide a relatively large internal and external surface area to insure the rapid dissipation of heat generated within the machine and which has means for preventing the entrance of extraneous matter between the enclosing member and the shaft of the machine equipped therewith.

A further object of this invention resides in the provision of an improved enclosing member for electric motors and dynamo machines which constitutes but a single unit to facilitate its application to motors and dynamo machines now in use.

And a still further object of this invention resides in the provision of an impeller or auxiliary rotating member carried by the shaft of the motor and dynamo machine exteriorly of the stationary closure member to create a circulation of air radially and outwardly over the outer surface of the closure member and prevent the entrance of extraneous matter to the interior of the machine about the rotor shaft.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a longitudinal, sectional view, with parts in elevation taken through an electric motor and dynamo machine equipped with my invention;

Figure 2 is a fragmentary front plan view of the enclosing member removed from the motor, and Figure 3 is a fragmentary view similar to Figure 1 illustrating a slightly modified form of my invention.

Referring now more particularly to the accompanying drawing in which like numerals represent like parts throughout the several views, 5 designates an electric motor and dynamo machine of any conventional design and construction having a stator 6 including a core 7 provided with windings 8 and a rotor 9 fixed to a shaft 10 journaled in bearings 11 of end frame members 12 which, with a central frame unit 13, confine and hold the parts together. In conventional open type electric motors and dynamo machines, the heat generated while in operation is carried off by air entering openings 14 in the end frame members 12 and expelled through outlets 15 in the frame unit 13.

Frequently, air impellers of conventional design rotate with the shaft 10 to increase the velocity of the cooling air passing through the machine and in the application of my improved device, the air impellers are removed to permit the positioning of novel enclosing members 16 at each side of the rotor.

Each enclosing member 16 consists of a radially fluted or pleated approximately conical disc shaped member 17 having a hub 18 cast on its inner periphery or apex and having an annular attaching flange 19 at its outer periphery, by which the member is secured in position, as will be later described. The hubs 18 have a plurality of annular channels 20 communicating with their bores 21 to receive felt or other packing washers 22 which close the clearance between the bores and the shaft and prevent the entrance of extraneous matter to the interior of the machine.

The fluted or pleated members 17 extend conically from the hub members 18 which are preferably positioned close to the rotor so that the members 17 are in relatively close thermal relation to the point of greatest heat, to have their outer portions adjacent the ends of the windings 8 and the flanges 19 extended from the outer periphery of the members 17 curve inwardly to position their horizontal portions 23 over the windings, being secured to any convenient stationary portion of the electric motor and dynamo machine as in the present instance, to annular flanges 24 of the stator by cap screws or the like 25. The members 17 and likewise the flanges 19 are preferably formed of metal having a relatively high degree of thermal conductivity and the pleats or flutes provide a series of radial channels or grooves that are open throughout their lengths to form relatively large internal and external surfaces and insure a maximum of cooling area within a minimum diameter. As the members 17 extend inwardly to be in close proximity to the source of heat, generated within the motor and dynamo machine it will be readily apparent that it is efficiently dissipated therethrough.

In this manner it is possible to totally enclose an electric motor and dynamo machine to prevent the entrance of extraneous matter to its live parts, without increasing its temperature rise or necessitating a change in its rating and in an efficient and inexpensive manner as the requirement for exacting and painstaking fitting of parts during assembly is entirely obviated.

In Figure 3, a slightly modified form of my invention is illustrated in which means are provided for producing a current of air which moves outwardly across the outer surface of the enclosing members 17 to more quickly carry off the heat being conducted therethrough and further safeguard against the passage of extraneous matter into the machine interior about the rotor shaft. This means consists of relatively small impellers or rotors 26 formed in substantially the same manner as the enclosing members 17, i. e. having a plurality of radial pleats with their inner peripheries embedded in hub members 27 cast directly onto the members 26. The outer peripheries of the impellers require no stiffening means as their radial lengths are relatively small. Set screws 28 secure the impellers 26 on the shaft 10, slightly spaced from the enclosing members 17 and, as will be readily apparent, rotation thereof sets up currents of fast moving air across the enclosing members to quickly carry off the heat conducted therethrough.

From the foregoing description, taken in connection with the accompanying drawing, it will be readily apparent to those skilled in the art to which an invention of the character described appertains, that I provide an improved and novel means for totally enclosing an otherwise open electric motor and dynamo machine which may be quickly applied to motors and dynamo machines at the time of manufacture or to machines already in use and which provides an efficient means for dissipating heat generated by the machine at an extremely low cost.

What I claim as my invention is:

1. A cooling and protecting member for electric motors and dynamo machines comprising an approximately disc shaped member formed of relatively thin bendable metal and folded to provide radially extending pleats to increase its internal and external surface areas, means mounting the member in the machine from a stationary part thereof, and means preventing the entrance of extraneous matter between the member and the rotor of the machine.

2. A cooling and protecting member for electric motors and dynamo machines comprising an approximately disc shaped member formed of relatively thin bendable metal and folded to provide radially extending pleats to increase its internal and external surface areas, means mounting the member in the machine from a stationary part thereof, means preventing the passage of extraneous matter between the member and the rotor of the machine, and means for producing a current of air which moves across the exterior of said member.

3. In an electric motor and dynamo machine, having a rotor, an enclosing member formed of relatively thin bendable metal and folded to provide radial pleats to increase its surface area, means mounting said member in the machine from a stationary part thereof, means preventing the passage of extraneous matter between the member and the rotor, and means carried by the rotor for producing a current of air which moves outwardly across the exterior of said member.

4. In an electric motor and dynamo machine having a rotor having a shaft and a stator having windings, an approximately disc shaped member formed of relatively thin bendable metal and fluted radially to provide relatively large internal and external surface areas, said member being substantially conical in shape, a flange carried by the outer periphery thereof which is adapted to overlie the windings of the stator, means for connecting the flange with the stator, a hub cast onto the inner periphery of the member and through which the rotor shaft extends, said conical shape of the member positioning the hub adjacent the rotor, and means carried by the rotor adjacent to and outwardly of the member for producing a current of air which moves outwardly across the exterior of said member.

5. In an electric motor and dynamo machine having a stator provided with windings and a rotor having a shaft, an enclosng member formed of relatively thin bendable metal and folded to provide radial pleats to increase its internal and external surface areas, said enclosing member being substantially conical in shape, a flange carried by the outer peripheral edge of the member and directed laterally to overlie the windings of the stator, means for connecting the flange with the stator to mount the enclosing member in a position with its inner portion directed inwardly of the stator windings to lie directly adjacent the rotor, a hub formed on the inner periphery of the enclosing member through which the shaft of the rotor projects, means for preventing the passage of extraneous matter between the rotor shaft and the hub, and an air impeller carried by the rotor shaft outwardly of the enclosing member, said impeller being similar in construction to the enclosing member and being formed of relatively thin bendable metal and folded to provide radial pleats.

In testimony whereof I have hereunto affixed my signature.

HARRY B. MORTIMER.